Patented Oct. 14, 1952

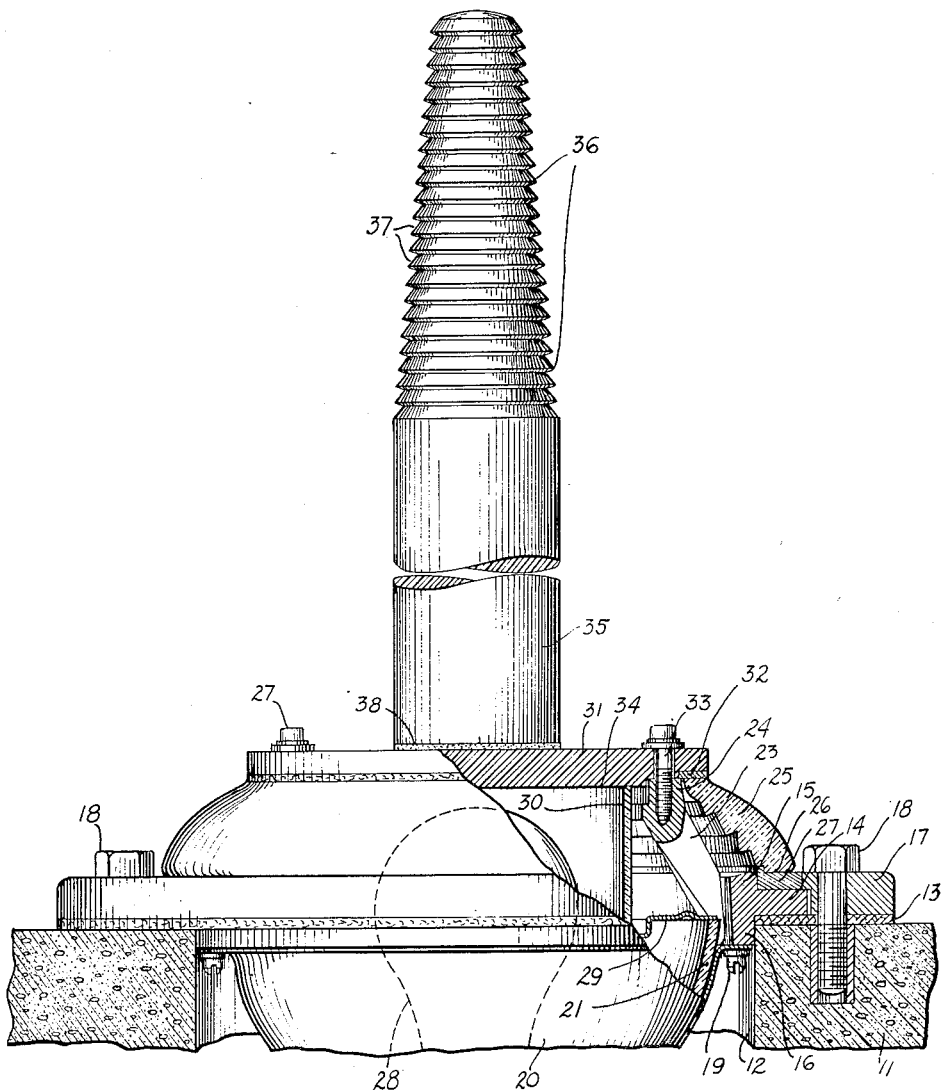

2,614,203

UNITED STATES PATENT OFFICE 2,614,203

RUNWAY MARKER FOR AIRPORTS

Harry Dalton, Jr., and Thomas M. Macario, Philadelphia, Pa.

Application April 19, 1948, Serial No. 21,874

1 Claim. (Cl. 240—1.2)

(Granted under the act of March 3, 1883, as amended April 30, 1928; 370 O. G. 757)

The present invention concerns a lighting device and in particular concerns an elevated marker light for use in marking airfield runways and taxiways during night operation and providing a visible guide during daytime operation.

In night operation of an airfield involving landing, take-off and other movements of aircraft, the marking of ground points is customarily effected by means of lights so that aircraft personnel can locate such ground points, which otherwise are not visible because of darkness. Thus each runway is provided customarily with two rows of lights, one along each border thereof, so that the particular runway in use at night can be marked by turning on the border lights.

Because the purpose of a marker light is to mark a point by projecting light therefrom, the characteristics of the projected light are of prime importance. On the one hand it is necessary that the projected light be of such character as to enable approaching airborne personnel to identify the marker from a distance in order that proper orientation of the aircraft in the landing circle and relative to the airfield can be made before the aircraft is to effect a contact landing. On the other hand it is necessary that the projected light be of such character as not to have a blinding effect especially at close range so that aircraft personnel about to take off on a runway having the marker lights turned on are not blinded. To provide the desired characteristics in the projected light we have discovered that the distribution of projected light is a factor of prime importance. The present invention provides a novel construction for projecting light having a novel distribution such that the marker is visible from an optimum distance and provides a minimum of blinding effect especially at close range.

There has been long recognized the desirability of constructing runway marker lights to project light from a point of the order of thirty inches above the ground so that the light is not shielded by grass and soil drift in the summer or by snow in the winter and is therefore visible at all times. To this end there have previously been constructed runway marker lights of the elevated cone type. An elevated cone light comprises a base installed below ground level and containing a transformer having connected thereto a cable assembly terminating in a molded rubber plug fixed into the base. This base part of the cone light remains undisturbed if struck by aircraft or ground equipment. The upper part of the cone light comprises a metal conduit extending upwardly from the base and on the top end of which is mounted a light together with a prismatic or Fresnal lens; a cone mounted near the top of the conduit and flaring downwardly and outwardly; and disposed inside of the conduit an electric cable connecting the base plug with the light. The upper part of the cone light suffers damage if struck by aircraft or ground equipment.

The cone type of construction has several disadvantages. As is true with other objects extending above ground level, a potential hazard is presented to aircraft and ground equipment striking the cone light. The cone light upon being struck sustains damage to itself and inflicts damage upon the striking object. The damage to the cone light requires replacement of the cone, particularly if constructed of fiber, and also replacement of the lens which cracks or shatters. Furthermore when the cone light is struck the electric circuit energizing the light is rendered inoperative so that the light goes out and this disturbs the pattern of lights along the sides of the runway to provide a potential hazard until replaced. Damage inflicted upon the aircraft or surface equipment striking the marker necessitates repair of such damage. The cone type of light in normal operation is found to be glaring and to present a false ground impression to an observer.

We overcome these objections by providing a marker light comprising a receptacle for inclosing a light source located at the surface of the ground, a light-transmitting, organic, plastic cover on the receptacle, and a rod extending upwardly from the cover so that light is conducted from the cover through the rod, the rod being formed of a single piece of light-conducting, organic, plastic material, the rod at its upper end being formed to provide means for projecting light into space above the ground.

The lighting device of the present invention overcomes the difficulties presented with the cone type of light by arranging the plastic receptacle cover and the plastic rod for disassembly when inadvertently struck. There is no damage to the device when the rod is inadvertently struck by aircraft or ground equipment because of disassembly and the disassembled rod can be remounted in operative position. Moreover, when the lighting device is disassembled and the rod is removed from the plastic cover no interruption of the electric circuit occurs and light continues to be emitted from the plastic cover whereby the pattern of light sources along the runway is not disturbed. The rod presents an obstruction that is easily disassembled so that there is no possibility of an aircraft or other ground equipment sustaining damage upon inadvertently striking the lighting device. In the presence of snow, the heat dissipated by the receptacle cover and rod is sufficient to melt the snow to form a crater around the device thus permitting emission of light from the device. The device does not emit glaring light and does not present a false ground impression to an observer.

An object of the invention is to provide a lighting device and in particular to provide a marker light for airfield runways.

Another object is to provide a marker light for projecting light having a novel distribution.

Another object is to provide a marker light that projects light from a point at a distance of the order of thirty inches above the ground and in which no electrical conductors are above the ground.

Another object is to provide a marker light having a shaft extending in operative position upwardly from the ground and arranged so that the shaft upon being struck automatically moves out of operative position.

Another object is to provide a marker light having a shaft extending in operative position upwardly from the ground and arranged so that the shaft upon being struck automatically becomes disassembled relative to the remainder of the structure.

Another object is to provide a marker light having a shaft extending upwardly from the ground and projecting light from the top thereof in which the shaft and light-projecting top form a unitary structure.

Further objects and advantages of this invention, as well as its construction arrangement and operation are apparent from the following description and claim, in which, The single figure is an elevational view with parts in section illustrating a preferred embodiment of the invention.

There is shown the ground 11 provided with a hole 12 therein. On the surface of the ground surrounding hole 12 is an annular gasket 13 upon which rests the transverse flange 14 of receptacle body 15 having a longitudinal flange 16 extending into hole 12. Transverse flange 14 is clamped against gasket 13 by means of a metal clamping ring 17 locked in place with respect to ground 11 and gasket 13 by means of bolts 18. Secured to the bottom of flange 16 by bolts 19 is a metal receptacle shell 20 within which is a glass reflector 21.

Extending upwardly from and integral with receptacle body 15 are legs 23 terminating in a support annulus 24. Disposed about the outside of legs 23 in spaced relation therefrom is a glass lens 25 the bottom face 26 of which rests upon a gasket 27 disposed on top of transverse flange 14.

Within the receptacle formed by receptacle shell 20, receptacle body 15 and lens 25 is an electric light bulb 28. Color filters 29 and 30 surround light bulb 28.

Clamped against the top of annulus 24 is a cover plate 31 forming a seal with the top of lens 25 by means of a gasket 32. Bolts 33 clamp cover plate 31 in place. Cover plate 31 is of disc shape and is provided with a depending central portion 34 for centering cover plate 31 within annulus 24. If desired, depending central portion 32 can be eliminated and cover plate 31 made of uniform thickness.

Cover plate 31 is made of light-transmitting material so that light from bulb 28 is transmitted through cover plate 31 and projected externally thereof. Preferably cover plate 31 is made of organic, plastic material resistant to heat and therefore not affected by the heat from light bulb 28. Phenol-formaldehyde resin having light-transmitting characteristics is found suitable and offers adequate resistance to heat.

Extending upwardly from the central portion of cover plate 31 externally thereof is a cylindrical rod 35. Rod 35 is made of light-conducting, organic, plastic material so that light transmitted through cover plate 31 to the adjacent end of rod 35 is conducted internally through the rod to the other end thereof. The light-conducting, organic, plastic material is of such nature that light is conducted internally of the rod from one end to the other by internal reflection substantially without lateral projection of light through the surface of the rod into space. Materials of this nature are known in the art and include polymerized methyl methacrylate resin such as "lucite" and methyl acrylate plastic such as "plexiglas" both of which materials are suitable for use in forming rod 35.

At its extremity remote from cover plate 31 rod 35 is tapered as indicated at 36 and is provided with a series of V-shaped, transverse serrations 37 that extend peripherally. Serrations 37 form a prism-like construction for projecting light from the interior of rod 35 into the space outside of rode 35. Serrations 37 are formed in such shape as to provide the desired distribution of light from the end of rod 35. If desired, the prism-like construction for projecting light into space can be formed internally at the end of rod 35 and such internal construction has the advantage of being protected from damage and from dirt.

Rod 35 is secured in place on cover plate 31 preferably by means of a cement layer 38. The cement that forms layer 38 is of any suitable type for bonding the light-conducting material of rod 35 to the light-transmitting material of cover plate 31 and it has the characteristic when set of transmitting light from cover plate 31 to the end of rod 35. Preferably the cement is capable of being applied in liquid or paste form and then setting to form a bond. The cement is of such nature that the bond retains its integrity when rod 35 is subjected to impact and stress less than a predetermined amount but the bond fails and permits rod 35 to separate from cover plate 31 when rod 35 is subject to impact and stress greater than the predetermined amount. It is found desirable to use a cement that forms a bond subject to failure when rod 35 is subjected to an impact of about two pounds magnitude. Such lateral impact against rod 35 might be caused by inadvertent striking thereof by an aircraft or ground equipment. When an impact and stress in excess of this amount is imposed upon rod 35, cement layer 38 fails and permits parting of rod 35 from cover plate 31 so that rod 35 topples into inoperative horizontal position thus avoiding damage to itself and damage by itself to the object inadvertently striking it. An example of cement known in the art is a 50% mixture (by volume) of monomeric methyl methacrylate, inhibited with .006% hydroquinone, and methylene dichloride.

If desired, instead of providing a cement layer 38, rod 35 can be mounted with respect to the cover plate 31 in any other suitable manner so that light normally is transmitted from cover plate 31 to rod 35 and so that rod 35 is permitted to move out of normal operative position into inoperative position when subjected to an impact and stress exceeding a predetermined magnitude.

In the preferred form of marker light shown in the figure when electric light 28 is turned on, light is transmitted through cover plate 31 in the area radially outward from the base of rod 35 and is projected into space. Light passing through cover plate 31 to the base of rod 35 is conducted internally through rod 35 to serrations 37 substantially without lateral projection of light through the surface of the rod into space and such light is projected into space at serrations 37.

The device is assembled for operation as follows. Cover plate 31 is mounted in place by means of bolts 33. Rod 35 is mounted in operative position on cover plate 31 by means of cement layer 38.

In operation light bulb 28 is turned on with the result that light is transmitted through cover plate 31 and projected into space. Light is also transmitted through cover plate 31 to the end of rod 35 and is conducted internally through rod 35 to serrations 37 where it is projected into space. In the event that rod 35 is subjected to an impact in excess of a predetermined magnitude such as two pounds, cement layer 38 fails and rod 35 parts from cover plate 31 and is permitted to fall over or move to an inoperative position. Thus if rod 35 is struck by an object such as the wheel of an aircraft or by ground equipment with an impact exceeding two pounds, rod 35 can fall over and out of the way of the striking object thus avoiding damage to rod 35 and to the striking object. When cement layer 38 fails, rod 35 in falling over and moving to inoperative position becomes disassembled from cover plate 31. The device is again conditioned for operation by cementing rod 35 back on cover plate 31.

The light marker provides projected light which enables airborne personnel to identify the marker from a maximum distance and this is because of the novel distribution of projected light which results from the projection of light into space from cover plate 31 and the projection of light into space from serrations 37 on the end of rod 35. The projected light is of such character as not to have a blinding effect especially at close range because the light is projected from the organic plastic material of cover plate 31 and rod 35.

The marker light projects light from serrations 37 at a distance of several feet above the ground but completely eliminates the use of electrical conductors above the ground so that broken electric wires and short-circuit conditions when the marker is inadvertently struck are eliminated. Protection against damage upon being inadvertently struck is provided because the integrity of cement bond 38 is destroyed and rod 35 moves into inoperative and disassembled position upon being struck. Upon moving into inoperative and disassembled position rod 35 is protected against damage because of the fact that it is formed of a single piece and the piece is formed of organic, plastic material that is highly resistant to impact damage.

It is understood that various modifications and changes can be made in this invention without departing from the spirit and scope thereof as set forth in the appended claim.

The invention described herein may be manufactured and used by or for the Government of the United States of America for governmental purposes without the payment of any royalties thereon or therefor.

What is claimed is:

A marker light for airfields comprising a receptacle for enclosing an electric light bulb, said receptacle being adapted to be imbedded in the ground with the top thereof projecting slightly above the ground surface, the side walls of the receptacle above the ground being formed of light-transmitting material, a light-transmitting, organic, plastic top wall in said receptacle, said top wall being exposed at least in part for projecting light upwardly into space above the ground, a cylindrical rod disposed completely externally of said receptacle and extending upwardly from the exposed part of the top wall so that light is conducted from the top wall through the rod, said rod being formed of a single piece of light-conducting, organic, plastic material, said rod remote from said top wall and the ground being tapered and formed with a series of V-shaped, transverse, perimetric serrations for projecting light into space above the ground, and a light-transmitting, organic, plastic cement for securing said rod to said top wall, said cement being such as to fail under a predetermined stress less than that required to break said rod or receptacle, whereby failure of said cement at said predetermined stress permits toppling of said rod from such receptacle without breaking of said rod or receptacle.

HARRY DALTON, JR.
THOMAS M. MACARIO.

REFERENCES CITED

The following references are of record in the file of this patent:

UNITED STATES PATENTS

| Number | Name | Date |
| --- | --- | --- |
| 1,924,338 | Wolmsley | Aug. 29, 1933 |
| 1,941,332 | Walker | Dec. 26, 1933 |
| 2,080,259 | Frei, Jr. | May 11, 1937 |
| 2,186,143 | Neugass | Jan. 9, 1940 |
| 2,225,151 | Borba | Dec. 17, 1940 |
| 2,242,981 | Pederson | May 20, 1941 |
| 2,308,844 | Wilshusen | Jan. 19, 1943 |
| 2,352,801 | Rolph | July 4, 1944 |
| 2,359,151 | Pennow | Sept. 26, 1944 |
| 2,424,064 | Stegeman | July 15, 1947 |
| 2,493,991 | Morrison | Jan. 10, 1950 |

FOREIGN PATENTS

| Number | Country | Date |
| --- | --- | --- |
| 497,163 | Great Britain | Dec. 14, 1940 |

OTHER REFERENCES

The Technology of Adhesives, Delmonte, 1947, pages 151 and 152.